(12) United States Patent
Saggio et al.

(10) Patent No.: US 6,425,717 B1
(45) Date of Patent: Jul. 30, 2002

(54) CARGO RESTRAINT DEVICE

(75) Inventors: Rosario Simon Saggio, Arcadia; Frank J. Caldwell, Jr.; Karlton K. Okamoto, both of Lakewood, all of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/708,370

(22) Filed: Nov. 8, 2000

(51) Int. Cl.[7] .......................... B60D 1/64; B63B 25/00; B64C 1/22
(52) U.S. Cl. ........................................... 410/79; 410/77
(58) Field of Search ....................... 410/77, 78, 79, 410/80; 244/118.1, 137.1; 414/536

(56) References Cited

U.S. PATENT DOCUMENTS

| | | |
|---|---|---|
| 3,693,920 A | 9/1972 | Trautman |
| 3,796,397 A | 3/1974 | Alberti |
| 4,121,789 A | 10/1978 | Lent et al. |
| 4,557,648 A | 12/1985 | Koch et al. |
| 5,112,173 A | 5/1992 | Eilenstein et al. |
| 5,356,250 A | 10/1994 | Vogg et al. |
| 5,433,564 A | 7/1995 | Sundseth |
| 5,564,654 A | 10/1996 | Nordstrom |
| 5,816,758 A | * 10/1998 | Huber |
| 5,871,317 A | 2/1999 | Huber et al. |
| 5,957,406 A | 9/1999 | Nelson et al. |
| 6,193,453 B1 | * 2/2001 | Kernkamp |

\* cited by examiner

*Primary Examiner*—Dennis H. Pedder
*Assistant Examiner*—Scott Carpenter
(74) *Attorney, Agent, or Firm*—Harness Dickey & Pierce P.L.C.

(57) ABSTRACT

A cargo restraint device including a base having an outer pawl and an inner pawl pivotally connected to the base. The outer pawl has a generally horizontal locking surface that cooperates with a generally horizontal locking surface on the inner pawl to provide a cargo restraint device capable of resisting vibration and downward forces applied to the inner pawl to prevent inadvertent disengagement of the cargo restraint device. During an unlocking movement, foot pressure is applied generally downward upon the outer pawl to enable the inner pawl to rotate to an unlocked position. The foot pressure is then released from the outer pawl to enable the outer pawl to rotate to an unlatched position.

10 Claims, 3 Drawing Sheets

CARGO RESTRAINT DEVICE

BACKGROUND OF THE INVENTION

1. Technical Field

This invention relates to cargo restraints for securing a cargo container or pallet and, more particularly, to an improved cargo restraint device that minimizes inadvertent disengagement thereof and a method of using the same.

2. Background Art

As is well known in the art, cargo restraints are commonly used in aircraft and other vehicles to secure cargo containers or pallets to prevent excessive movement during transport. Typically, cargo containers are loaded, handled, and aligned into their approximate position within the compartment of the aircraft. As the cargo container is positioned into its final position, a retractable cargo restraint is lifted from a position within the floor into an engaged and locked position. The cargo restraint overlaps a flange-like portion or pocket of the cargo container and secures the cargo container relative to the floor to minimize vertical and horizontal movement thereof.

As described in detail in U.S. Pat. No. 3,796,397, which is incorporated herein by reference, a cargo restraint is shown having a frame secured within a track formed in the aircraft floor. The frame may include rollers for guiding a pallet or container thereover. The cargo restraint further includes a pair of rotatable latch arms or pawls, which are moveable between an erect, operative position and a collapsed position. In the erect, operative position, the first of the pair of pawls is engaged with a pallet or container. In the collapsed position, the first and second pawls lie within the frame and below the upper surface of the rollers to enable free movement of the containers or pallets. Typically, one or more cargo restraints is provided at opposite ends of the container to minimize movement of the container during acceleration and deceleration of the aircraft or other vehicle.

In operation, conventional cargo restraints are released from their erect, operative position to their collapsed position by depressing the inner pawl. This depression of the inner pawl releases the inner pawl from the outer pawl thereby enabling the outer pawl to pivot and disengage from the container under the force of a spring. The pawls are then allowed to pivot to the collapsed position to enable the container to be moved freely on the rollers. However, in known designs the cargo restraints may become inadvertently disengaged from the container due to vibration or external impact applied to the pawls. Attempts have been made to overcome this problem by adding various additional locking features, such as retractable pins, to prevent rotation of the pawls. For example, U.S. Pat. No. 4,121,789, which is incorporated by reference herein, illustrates such a locking pin design. However, this adds to the cost, complexity, and difficulty in operating the cargo restraint. Additionally, it is now believed that under extreme force, such as 13,000 lbs., these pins may shear and consequently fail to secure the cargo container. Moreover, this particular prior art design further requires unlocking of the pins by hand to unlatch the pawl from the cargo container. Accordingly, there exists a need in the relevant art to provide a cargo restraint device that is capable of preventing inadvertent disengagement caused by vibration or external impacts without adding additional parts.

It should be appreciated that the less time it takes to prepare an aircraft for departure, the more profitable that aircraft will become. Thus, time saved during operations, such as cargo handling, continue to be of utmost importance. Therefore, quickness, ease, and simplicity of the cargo handling equipment, such as the cargo restraints, are needed. Generally, a cargo restraint device that is capable of being unlocked by foot pressure is preferred as this method would enable a worker to quickly unlock and move the container without having to reach down and unlock a large container by hand. This method of unlocking the cargo restraint by foot pressure would further enable the worker to steady the container during the unlocking process. Accordingly, there exists a need in the relevant art to provide a cargo restraint device that is capable of being quickly disengaged by foot pressure, which does not inadvertently disengage due to vibration or external impact.

Accordingly, it is a principal object of the present invention to provide a cargo restraint device that can reliably secure a cargo container or pallet within an aircraft or vehicle.

It is another object of the present invention to provide a cargo restraint device that can reliably resist vibration or external impact to prevent inadvertent disengagement of the cargo restraint device from the cargo container or pallet.

It is another object of the present invention to provide a cargo restraint device that can be actuated by foot pressure without the need to manually unlatch the cargo restraint device by hand.

It is still another object of the present invention to provide a cargo restraint device that does not require complicated locking features that require additional parts and/or components.

It is yet another object of the present invention to provide a cargo restraint device that is not susceptible to the shortcomings of the prior art designs.

SUMMARY OF THE INVENTION

The above and other objects are provided by a cargo restraint device in accordance with preferred embodiments of the present invention. The cargo restraint device of the present invention employs a pair of cooperating surfaces on the pawls that provide a locking engagement that is resistant to vibration and external impact. However, this pair of cooperating surfaces on the pawls may be easily and conveniently disengaged by properly positioned foot pressure. The cargo restraint device of the present invention achieves these results without the need for additional parts and/or components as required by the prior art method.

The cargo restraint device of the present invention includes a base having an outer pawl and an inner pawl pivotally connected to the base. The outer pawl includes a generally horizontal locking surface that cooperates with a generally horizontal locking surface on the inner pawl to provide a cargo restraint device capable of resisting vibration and downward forces applied to the inner pawl to prevent inadvertent disengagement of the cargo restraint device.

The cargo restraint device of the present invention is unlatched by applying generally downward foot pressure upon the outer pawl to enable the inner pawl to rotate to an unlocked position. The foot pressure is then released from the outer pawl to enable the outer pawl and inner pawl to rotate to an unlatched position.

BRIEF DESCRIPTION OF THE DRAWINGS

The various advantages of the present invention will become apparent to one skilled in the art by reading the following specification and subjoined claims and by referencing the following drawing in which:

DETAILED DESCRIPTION OF THE PREFERRED EMBODIMENT

Figure 1:
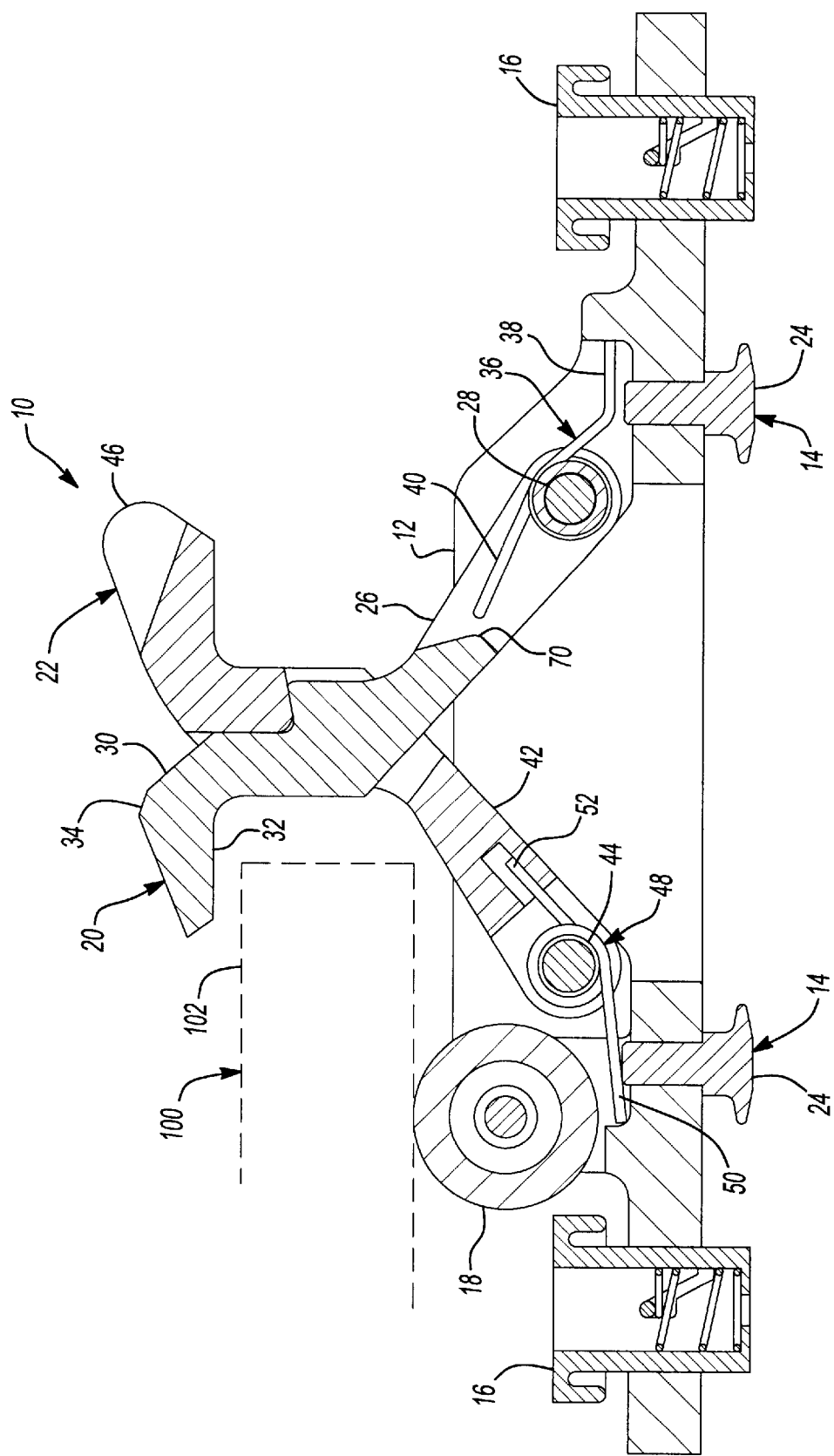
FIG. 1 is a side view, with portions in cross-section, of a cargo restraint device according to the principles of the present invention.

Referring to the drawings, a cargo restraint device 10 is provided for latching and unlatching cargo containers or pallets, schematically shown as 100, in a quick and efficient manner. Cargo restraint device 10 includes a generally rectangular frame or base 12 that is adapted to be received within a fore and aft track (not shown) formed in the flooring of an aircraft or cargo vehicle, or possibly a railroad car or truck. Such fore and aft tracks are of conventional design and, thus, in the interest of brevity, they will not be described in detail herein. Furthermore, in the interest of brevity, the cargo restraint device of the present invention will be described in connection with an aircraft cargo area. However, it should be understood that the principles of the present invention are equally applicable to other applications, such as in trucks, railroad cars, and the like.

Cargo container 100 is typically loaded into a cargo area of an aircraft using various motor driven wheels and/or casters to enable cargo container 100 to be efficiently moved throughout the cargo area. Once cargo container 100 is properly aligned in the cargo area, a plurality of cargo restraint devices 10 are used to retain or secure cargo container 100 in place during transport. Thus, cargo container 100 is prevented from moving fore and aft by cargo restraint device 10.

Cargo restraint device 10 is commonly mounted within the tracks of the cargo area in pairs to cooperate to retain each fore and aft side of each cargo container. However, it should be understood that a single cargo restraint device 10 could be used on each fore and aft side of cargo container 100 depending on the holding capacity required.

Cargo restraint device 10 comprises base 12, a pair of T-sectioned studs 14 extending from the planar undersurface of base 12, a pair of locking elements 16, an optional roller element 18, an outer pawl 20, and an inner pawl 22. Each T-sectioned stud 14 includes a head 24, which is sized to be received within and retained by a channel (not shown) formed in the tracks of the cargo area floor. The pair of locking elements 16 is provided for lockingly engaging cargo restraint device 10 with the track to provide a connection therebetween to prevent longitudinal movement of cargo restraint device 10 relative to the cargo area floor. Roller element 18 is adapted to support and guide cargo container 100, while it is moved across cargo restraint device 10. Outer pawl 20 is adapted to generally engage and retain a flange 102 formed along a base section of cargo container 100, while inner pawl 22 is adapted to engage and selectively lock outer pawl 20 in an erect, operative engaged position. It should be appreciated that inner pawl 22 is further adapted to generally engage and retain a flange of an adjacent cargo container (not shown). That is, cargo restraint device 10 can simultaneously restrain a pair of adjacent cargo containers. However, only restraining a single container will be discussed in this application.

Figure 2:
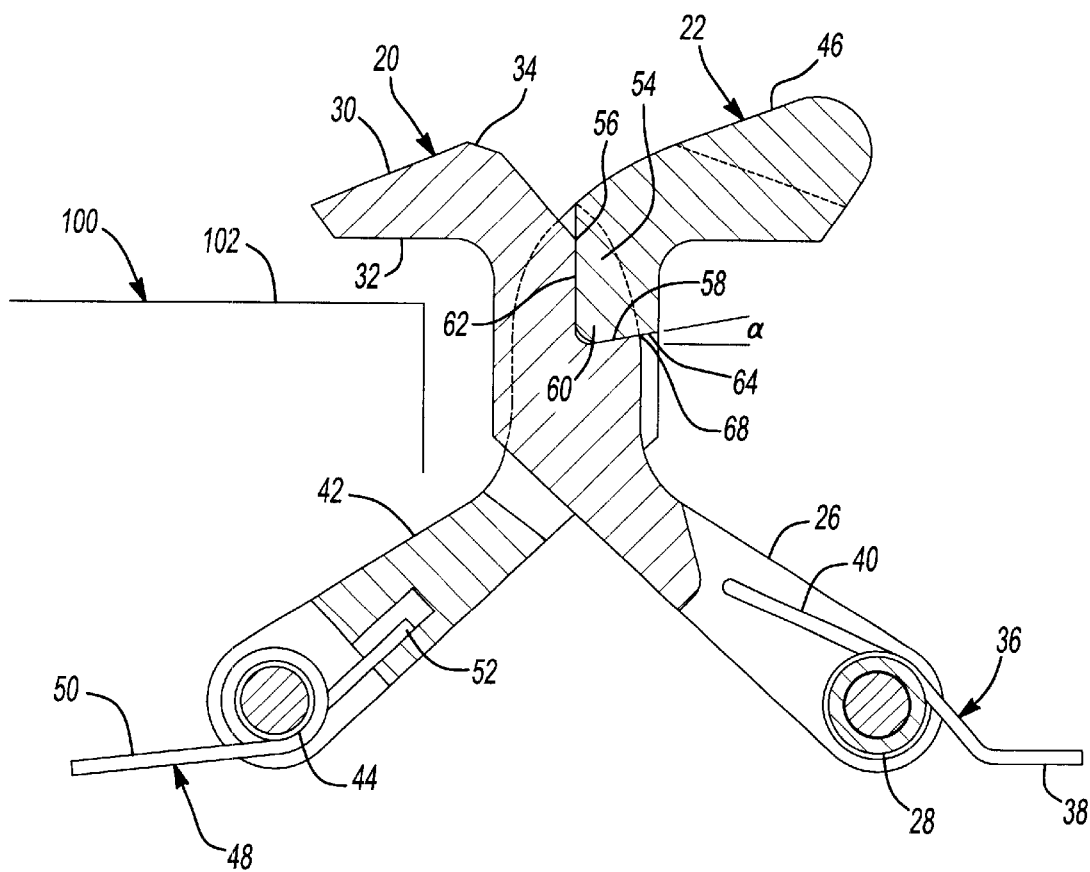
FIG. 2 is a cross-sectional view of the pawls of the present invention shown in an erect, operative position.

Outer pawl 20 and inner pawl 22 will now be described in detail with reference to FIGS. 1–3. Outer pawl 20 is generally U-shaped (not shown) such that it is generally outside or surrounds inner pawl 22. The pair of downwardly extending legs 26 of outer pawl 20 are each pivotally coupled to base 12 via pivot 28. Outer pawl 20 includes a cross member 30 that interconnects downwardly extending legs 26 and spans the distance therebetween, thereby defining the U-shape. Cross member 30 is provided with an engaging surface 32 which is adapted to be substantially parallel to an upper surface of flange 102 of cargo container 100. As best seen in FIGS. 1 and 2, engaging surface 32 of outer pawl 20 is generally offset from the upper surface of flange 102 when outer pawl 20 is in the erect, operative position. This offset relationship enables outer pawl 20 to be manually pivoted slightly counter-clockwise until engaging surface 32 of outer pawl 20 contacts the upper surface of flange 102 to unlock inner pawl 22 from outer pawl 20. This movement will be described in more detail below.

Figure 3:
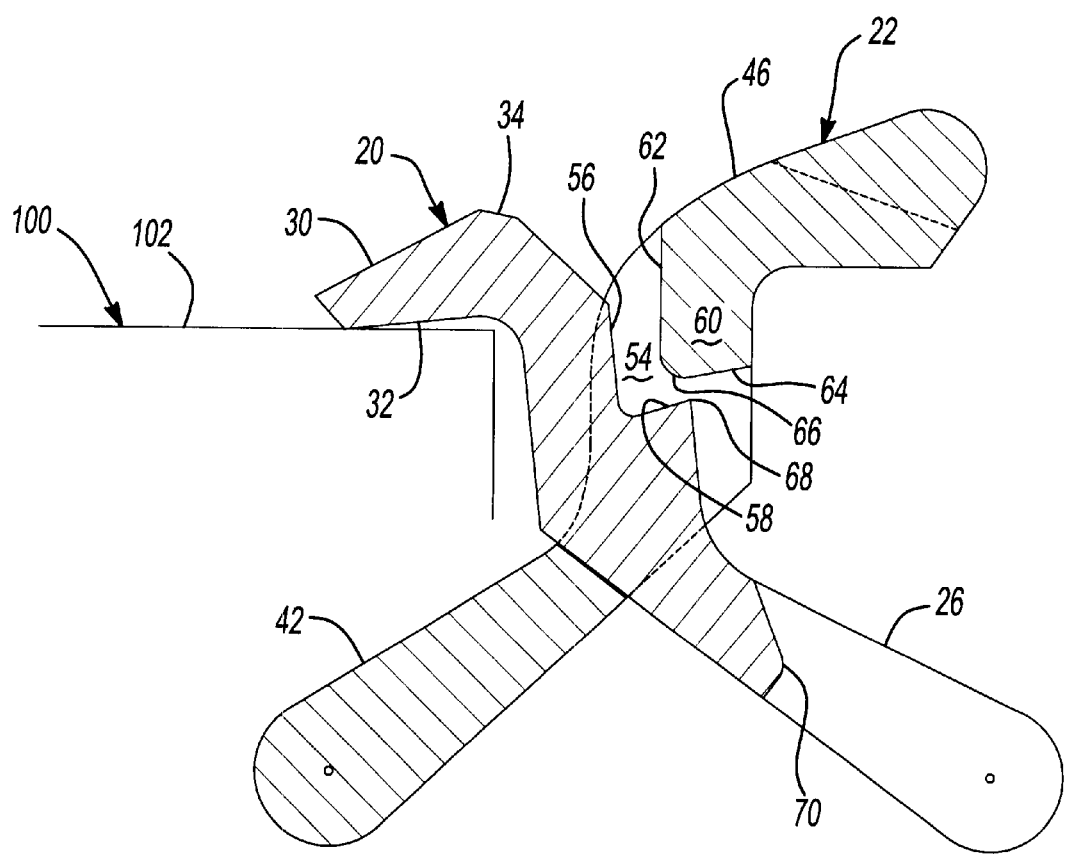
FIG. 3 is a partial cross-sectional view of the pawls of the present invention shown in an intermediate unlocking position.

As best seen in FIGS. 2 and 3, cross member 30 of outer pawl 20 further includes a thickened portion 34 extending across a portion of cross member 30. Thickened portion 34 is adapted to receive force applied thereto for releasing the locking engagement of outer pawl 20 and inner pawl 22. Preferably, this applied force is applied by a worker's foot to enable the worker to quickly and conveniently unload cargo container 100.

At least one torsion spring 36 is provided about pivot 28 for biasing outer pawl 20 in a clockwise direction about pivot 28 to a stowed position. Torsion spring 36 includes a first leg 38 attached to base 12 and a second leg 40 attached to outer pawl 20.

Inner pawl 22 is generally Y-shaped (not shown) with downwardly extending legs 42 of this Y-shape being pivotally coupled to base 12 via pivot 44. Inner pawl 22 includes an upwardly extending leg 46, which together with downwardly extending legs 42 define the Y-shape. As described above, inner pawl 22 is spaced within outer pawl 20 for locking engagement therewith.

At least one torsion spring 48 is provided about pivot 44 for biasing inner pawl 22 in a clockwise direction about pivot 44 to the engaged and locked position. Torsion spring 48 includes a first leg 50 attached to base 12 and a second leg 52 attached to inner pawl 22.

In order to effect an engaged and locked position between outer pawl 20 and inner pawl 22, so as to retain and secure cargo container 100, outer pawl 20 and inner pawl 22 are provided with cooperating locking surfaces that prevent inadvertent disengagement of inner pawl 22 from outer pawl 20. Specifically, as shown in FIGS. 2 and 3, downwardly extending legs 26 of outer pawl 20 includes a pair of recesses 54 (only one shown) formed on an interior, backside of cross member 30. Recesses 54 of outer pawl 20 each defines a generally vertical locking surface 56 and a generally horizontal locking surface 58.

A pair of protrusions 60 are formed on exterior sides of upwardly extending leg 46 of inner pawl 22 to cooperate with recesses 54 of outer pawl 20. Protrusions 60 of inner pawl 22 each defines a generally vertical locking surface 62 and a generally horizontal locking surface 64. Generally vertical locking surface 56 of outer pawl 20 engages and cooperates with generally vertical locking surface 62 of inner pawl 22 to resist lateral forces applied to either outer pawl 20 or inner pawl 22. By way of non-limiting example, these lateral forces may originate from movement of cargo container 100 against outer pawl 20 or external impact against inner pawl 22. Preferably, locking surfaces 56 and 62 are generally vertically disposed; however, locking surfaces 56 and 62 may be angled depending upon the specific geometry of outer pawl 20 and inner pawl 22.

Likewise, generally horizontal locking surface 58 of outer pawl 20 engages and cooperates with generally horizontal locking surface 64 of inner pawl 22 to resist forces that would otherwise disengage inner pawl 22 from outer pawl 20. For example, the cooperation of locking surface 58 and locking surface 64 resists external impact or pressure applied downwardly against inner pawl 22. This external impact or downward pressure applied to a conventional inner pawl would cause the conventional inner pawl to disengage from the outer pawl and allow the outer pawl to swing freely, thereby unlocking the cargo container. Similarly, the cooperation of locking surface 58 and locking surface 64 resists upward force applied to engaging surface 32 of outer pawl 20, thereby preventing upward translation of cargo container 100.

Preferably, locking surface 58 and locking surface 64 are each inclined above the horizontal at an angle between about 0° and about 60°. More preferably, locking surface 58 and locking surface 64 are each inclined about 10° above the horizontal, generally indicated as α. By inclining locking surfaces 58 and 64, outer pawl 20 and inner pawl 22 remain in locking engagement with each other even if an external force is applied against inner pawl 22. It should be appreciated that while it is preferable for locking surfaces 58 and 64 to be inclined at an angle between about 0° and about 60°, locking surfaces 58 and 64 may each be inclined or declined at any angle that enables inner pawl 22 to remain in locking engagement with outer pawl 20, irrespective of any external impact applied to inner pawl 22. It should be appreciated that the inner pawl 22 and the outer pawl 20 of the present invention effectively and efficiently resist becoming unlocked when force is applied to inner pawl 22, unless a first unlocking movement is initiated.

During operation, cargo container 100 is loaded into the cargo area of the aircraft using various motor driven wheels and caster to enable cargo container 100 to be efficiently moved throughout the cargo area. Once cargo container 100 is properly aligned in the cargo area, the plurality of cargo restraint devices 10 are used to retain or secure cargo container 100 in a predetermined position for transport. Specifically, outer pawl 20 is rotated counter-clockwise about pivot 28, against the force of torsion spring 36, to a position generally adjacent flange 102 of cargo container 100. Simultaneously, inner pawl 22 is then rotated counter-clockwise about pivot 44, against the force of torsion spring 48. During this movement, the apex 66 (FIG. 3) of locking surface 62 and locking surface 64 of inner pawl 22 will overcome an edge 68 formed at an end of locking surface 58 of outer pawl 20. Once apex 66 overcome edge 68 of outer pawl 20, locking surfaces 62 and 64 of inner pawl 22 will engage locking surfaces 56 and 58 of outer pawl 20, respectively.

To unlock cargo restraint device 10, a worker simply applies downward foot pressure to cross member 30 of outer pawl 20 thereby rotating outer pawl 20 counter-clockwise about pivot 28 until engaging surface 32 contacts flange 102 of cargo container 100 (see FIG. 3). During this movement, generally vertical locking surface 56 of outer pawl 20 is separated from generally vertical locking surface 62 of inner pawl 22. However, generally horizontal locking surface 58 of outer pawl 20 remains in contact with generally horizontal locking surface 64 of inner pawl 22 under the force of torsion spring 48 until the apex 66 of locking surfaces 62 and 64 slides over edge 68 of outer pawl 20. Once the apex 66 of locking surfaces 62 and 64 overcome edge 68, inner pawl 22 is allowed to freely rotate clockwise about pivot 44. It should be understood that torsion spring 48 causes inner pawl 22 to rotate clockwise into a collapsed position. Foot pressure may then be removed from outer pawl 20 to permit outer pawl 20 to rotate into a collapsed position below the plane of roller elements 18, such that cargo container 100 may freely be moved.

As should be appreciated from the foregoing discussion, the cargo restraint device of the present invention provides a reliable and cost effective cargo restraint device that is capable of being unlocked by foot pressure, which also resists vibration and external impact. Unlike prior art designs, the cargo restraint of the present invention will not become disengaged when force is applied to the inner pawl. Thus, additional and complicated locking components are not required. Since the cargo restraint device of the present invention may only be released by downward pressure applied only to the outer pawl, it resists lateral forces applied to either the outer pawl or the inner pawl. Moreover, the cargo restraint device of the present invention resists upwardly directed forces applied to either the outer pawl or the inner pawl and downwardly directed forces applied to the inner pawl. Accordingly, the cargo restraint device of the present invention provides a safe, effective, simple, and cost effective method of securing cargo containers.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A cargo restraint device comprising:
   a base;
   an outer pawl pivotally connected to said base, said outer pawl having a first locking surface; and
   an inner pawl pivotally connected to said base, said inner pawl having a second locking surface, said outer pawl and said inner pawl being positionable between an operative position where said first locking surface engages said second locking surface and a collapsed position where said first locking surface disengages said second locking surface, said first locking surface and said second locking surface preventing any unlocking pivotal movement of said inner pawl when in said operative position.

2. The cargo restraint device according to claim 1 wherein said first locking surface and said second locking surface are each inclined at an angle between about 0 degrees and about 60 degrees from horizontal when in said operative position.

3. The cargo restraint device according to claim 1 wherein said first locking surface and said second locking surface are each inclined at an angle of about 10 degree from horizontal when in said operative position.

4. The cargo restraint device according to claim 1 wherein said outer pawl includes a third locking surface selectively engaging with a fourth locking surface on said inner pawl, said third locking surface and said fourth locking surface cooperating to prevent unlocking pivotal movement of said outer pawl in response to a laterally applied force to said inner pawl.

5. The cargo restraint device according to claim 1, further comprising:
   a first spring member operatively coupled with said outer pawl, said first spring member biasing said outer pawl into said collapsed position; and a second spring member operatively coupled with said inner pawl, said second spring member biasing said inner pawl into said collapsed position.

6. A cargo restraint device for retaining a cargo item, said cargo restraint device comprising:

a base structure;

a first pawl member having a first locking surface and a second locking surface, said first pawl member being pivotally mounted to said base structure; and a second pawl member having a third locking surface and a fourth looking surface, said second pawl member being pivotally mounted to said base structure, said first and second pawl members being positionable in a latched position in which said first locking surface engages with said third locking surface and said second locking surface engages with said fourth locking surface; said first and second pawl members further being positionable in an unlatched position in which said first locking surface disengages from said third locking surface and enables said first pawl member to freely rotate; said first locking surface and said third locking surface preventing any unlatching pivotal movement of said second pawl when in said latched position.

7. The cargo restraint device according to claim 6 wherein said first locking surface and said third locking surface are each inclined horizontally about 10 degrees when in said latched position.

8. The cargo restraint device according to claim 6 wherein an angle between said first locking surface and said third locking surface and an angle between said second locking surface and said fourth locking surface are each in the range of 60 degrees to 120 degrees.

9. The cargo restraint device according to claim 6 wherein an angle between said first locking surface and said third locking surface and an angle between said second locking surface and said fourth locking surface are each about 80 degrees.

10. The cargo restraint device according to claim 6, further comprising:

a first spring member operatively coupled with said first pawl member, said first spring member biasing said first pawl member into said unlatched position; and a second spring member operatively coupled with said second pawl member, said second spring member biasing said second pawl member into said unlatched position.

* * * * *

UNITED STATES PATENT AND TRADEMARK OFFICE
CERTIFICATE OF CORRECTION

PATENT NO.   : 6,425,717 B1
DATED        : July 30, 2002
INVENTOR(S)  : Rosario Simon Saggio, Frank J. Caldwell, Jr. and Karlton K. Okamoto It is certified that error appears in the above-identified patent and that said Letters Patent is hereby corrected as shown below:

<u>Column 7,</u>
Line 11, "looking" (second occurrence) should be -- locking --

Signed and Sealed this

Twenty-ninth Day of April, 2003

JAMES E. ROGAN
*Director of the United States Patent and Trademark Office*